United States Patent
Xu et al.

(10) Patent No.: US 9,698,423 B2
(45) Date of Patent: Jul. 4, 2017

(54) RECHARGEABLE ZINC ION BATTERY BASED ON CARBON CATHODE

(71) Applicant: Shenzhen Cubic-Science Co., Ltd., Shenzhen, Guangdong (CN)

(72) Inventors: Chengjun Xu, Shenzhen (CN); Yanyi Chen, Shenzhen (CN); Shan Shi, Shenzhen (CN); Feiyu Kang, Shenzhen (CN)

(73) Assignee: Shenzhen Cubic-Science Co., Ltd., Shenzhen (CN)

( * ) Notice: Subject to any disclaimer, the term of this patent is extended or adjusted under 35 U.S.C. 154(b) by 14 days.

(21) Appl. No.: 14/331,546

(22) Filed: Jul. 15, 2014

(65) Prior Publication Data
US 2015/0255792 A1    Sep. 10, 2015

Related U.S. Application Data

(63) Continuation of application No. PCT/CN2014/072872, filed on Mar. 4, 2014.

(51) Int. Cl.
*H01M 4/133*    (2010.01)
*H01M 4/583*    (2010.01)
(Continued)

(52) U.S. Cl.
CPC .............. *H01M 4/583* (2013.01); *H01M 4/38* (2013.01); *H01M 4/42* (2013.01); *H01M 4/622* (2013.01);
(Continued)

(58) Field of Classification Search
CPC ........ H01M 4/583; H01M 4/622; H01M 4/38; H01M 4/42; H01M 10/36; H01M 2300/0002
See application file for complete search history.

(56) References Cited

U.S. PATENT DOCUMENTS 3,540,935 A    11/1970    Keating et al.
7,153,607 B2   12/2006    Iwakura et al.
(Continued)

FOREIGN PATENT DOCUMENTS

CN    1393043    1/2003
CN    1971978    5/2007
(Continued)

OTHER PUBLICATIONS

Machine translation of CN 103545123, retrieved from <http://worldwide.espacenet.com/?locale=EN_ep> on Dec. 15, 2015.*
(Continued)

*Primary Examiner* — Cynthia K Walls
(74) *Attorney, Agent, or Firm* — Hamre, Schumann, Mueller & Larson, P.C.

(57) ABSTRACT

The present invention discloses a rechargeable zinc ion battery, in which anodic zinc will be electrochemically dissolved as $Zn^{2+}$ ions, diffuses to the cathodic electrode/electrolyte interface through the electrolyte, and zinc ions subsequently inserted in carbon material during discharging. In charging, above-mentioned process will be reverse. The rechargeable zinc ion battery comprises a carbon cathode; a zinc anode separated from cathode; an aqueous electrolyte contains zinc ions.

10 Claims, 4 Drawing Sheets

(51) Int. Cl.
  *H01M 10/36* (2010.01)
  *H01M 4/38* (2006.01)
  *H01M 4/42* (2006.01)
  *H01M 4/62* (2006.01)

(52) U.S. Cl.
  CPC .... *H01M 10/36* (2013.01); *H01M 2300/0002* (2013.01)

(56) References Cited

U.S. PATENT DOCUMENTS

| | | |
|---|---|---|
| 8,663,844 B2 | 3/2014 | Kang et al. |
| 2010/0178543 A1 | 7/2010 | Gruner et al. |
| 2011/0261502 A1 | 10/2011 | Gruner |
| 2013/0189580 A1 | 7/2013 | Dai et al. |
| 2013/0260246 A1 | 10/2013 | Chen et al. |
| 2014/0199578 A1 | 7/2014 | Mitra et al. |

FOREIGN PATENT DOCUMENTS

| | | |
|---|---|---|
| CN | 101540417 | 9/2009 |
| CN | 102299389 | 12/2011 |
| CN | 103545123 | 1/2014 |
| JP | 2006-517722 | 7/2006 |
| JP | 2009-500806 | 1/2009 |
| JP | 2012-524363 | 10/2012 |
| JP | 2015-28897 | 2/2015 |

OTHER PUBLICATIONS

Popov, Carbon nanotubes: properties and application, Materials Science and Engineering R 43 (2004) 61-102.*

\* cited by examiner

RECHARGEABLE ZINC ION BATTERY BASED ON CARBON CATHODE

This application is a continuation of PCT/CN2014/072872 filed Mar. 4, 2014 and claims the benefit of the PCT/CN2014/072872, which is incorporated by reference in its entirety.

BACKGROUND OF THE INVENTION

This invention relates to rechargeable zinc ion batteries with high capacity.

The high capacity batteries are vital for our modern lives. The annual worldwide market of batteries is over 100 billion dollars and prospers the boost of related industries, for example, consumer electronics, electric vehicles, and communications etc. Development of high capacity battery could push the related industries forward.

The recent U.S. patent (U.S. Pat. No. 8,663,844 B2) invented a so-called zinc ion battery, which uses α-MnO$_2$ as cathode, zinc as anode and ZnSO$_4$ aqueous solution as the electrolyte. The battery chemistry of zinc ion battery is written as:

Cathodic reaction:

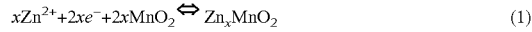

$$x\text{Zn}^{2+} + 2xe^- + 2x\text{MnO}_2 \Leftrightarrow \text{Zn}_x\text{MnO}_2 \quad (1)$$

Anodic reaction:

$$\text{Zn} \Leftrightarrow \text{Zn}^{2+} + 2e^- \quad (2)$$

The advantage of zinc ion battery is ecofriendly, safety and low cost. However, the disadvantage of zinc ion battery is the low capacity of the battery. The capacity of MnO$_2$ is as low as 200 mAh g$^{-1}$, which preclude it from various applications for example electric vehicles. Therefore, it is necessary to discover new cathode active materials with a high capacity to further improve the energy density of zinc ion battery.

SUMMARY OF THE INVENTION

The purpose of this patent is to invent a new battery with high capacity.

Carbon materials, for example carbon nanotube, graphene, carbon fiber, carbon foam, carbon nanofiber, fullerene, etc., are very interesting and attractive materials, which are widely used in energy storage devices such as lithium ion batteries or supercapacitors. The carbon materials for example graphene, carbon nanotube, are worldwide investigated as the active materials for lithium ion batteries. Graphene or carbon nanotube can store and release lithium ions by the insertion/extraction of lithium ions to obtain a high capacity of over 1000 mAh g$^{-1}$.

Recently, we found that the carbon materials can be used as cathode active materials in the zinc ion battery. The insertion/extraction of Zn$^{2+}$ ions into/from occurs in certain carbon materials similar to lithium ions. The capacity of active carbon materials can be over 1000 mAh g$^{-1}$. Therefore, we firstly discourse a high capacity zinc ion battery, which use carbon material as cathode, zinc as anode and the aqueous solution containing Zn$^{2+}$ ions as electrolyte. The carbon material is denoted as NC. The battery chemistry of this high capacity zinc ion battery should be

$$x\text{Zn}^{2+} + 2xe^- + \text{NC} \Leftrightarrow \text{Zn}_x\text{NC} \quad (3)$$

$$\text{Zn} \Leftrightarrow \text{Zn}^{2+} + 2e^- \quad (4)$$

Based on the equations (3) and (4), a new rechargeable zinc ion battery is proposed. In discharging, anodic zinc will be electrochemically dissolved as Zn$^{2+}$ ions, which diffuses to the cathodic electrode/electrolyte interface through the electrolyte, and zinc ions are subsequently stored by carbon materials. This process will be reverse when charging. Therefore, this battery could be seen as "rocking-chair" battery.

The rechargeable zinc ion battery comprises a cathode, a zinc anode, a separator for separating said cathode from said anode, and an aqueous electrolyte containing zinc ions.

The said cathode can be composed of a compressed mixture of carbon particles, which can store and release zinc ions (Zn$^{2+}$ ions), electrically conductive particles and a binder, and this compressed mixture is normally attached by the used binder on a current collector.

The said cathode can be composed of one uniform carbon materials for example carbon nanotube fabric, carbon fiber fabric, etc.

The said carbon material can be any shape of carbon element, for example, fullerene, carbon nanotube, graphene, carbon fiber, carbon foam. The said carbon material can be the composite of over two different carbon materials.

The said zinc anode is in any shapes of pure zinc or zinc alloy, such as the foil, film, plat, grid, pillar, etc.

The said zinc anode can also be a compressed mixture of pure zinc and/or zinc alloy particles, electrically conductive particles and a binder, and this compressed mixture is normally attached by the used binder on a current collector.

The said binder is selected from the group consisting of natural and synthetic rubbers, polysulfone, acrylic polymers, epoxy resins, polystyrene and polytetrafluoroethylene.

The said aqueous electrolyte comprises a solvent and a solute. The said solvent is water. The said solute could be zinc nitride, zinc chloride, and/or zinc sulfate, etc. The pH value of the said electrolyte can be adjusted from by acid or alkaline. The pH value of said aqueous electrolyte can be adjusted between 4 and 7.

The said separator is a thin layer of a suitable material, which can physically separate the said anode from the cathode. This separator is nonoxidizable and stable in the cell environment.

The said rechargeable zinc ion battery can be configured as "button" cell, cylindrical cell or rectangular cell, etc.

In addition, additives with specific function can be added in the anode, cathode or electrolyte to improve the performance of the batteries.

The said cathode is preferably composed of the current collector and the cathode film attached to the current collector. The said cathode film preferably contains nano carbon materials and binders. The said nano carbon materials are preferably the carbon materials with specific nanostructure and the thickness of the said nano carbon materials is preferably 100 nanometers or less.

The said carbon material is preferably the carbon nanotube, graphene, or the mixture of carbon nanotube and graphene at any content.

Graphene and carbon nanotube are the specific carbon materials with unique nanostructure. Graphene is composed of one layer or maximum ten layers of carbon atoms. Carbon nanotube can be considered as the curly tube of graphene. Due to the unique nanostructure of these two nano carbon materials, graphene and carbon nanotube have unique behaviors and can store massive zinc ions. The zinc ion storage capacity of graphene and carbon nanotube is 1000 mAh g$^{-1}$ or more, which is five times higher than manganese dioxides.

The said zinc anode is preferably the foil of pure zinc or zinc alloy.

The said zinc anode can also preferably be a compressed anode film of pure zinc and/or zinc alloy particles, electrically conductive particles and a binder, and this compressed film is normally attached by the used binder on a current collector.

The said anode film preferably contains anticorrosion agents. The weigh content of the anticorrosion agents in the anode film is preferably 1 percent or less.

Preferably, the said anticorrosion includes indium oxides, indium hydroxide, or the mixture of indium oxides and indium hydroxide.

Preferably, the said cathode film contains conductive additives, whose weight content is preferably 50% or less.

Preferably, the said anode film contains conductive additives, whose weight content is preferably 50% or less.

The said aqueous electrolyte comprises a solvent and a solute. The said solvent is water. The said solute could be zinc nitride, zinc chloride, and/or zinc sulfate, etc.

DETAILED DESCRIPTION OF THE PREFERRED EMBODIMENTS

Compositions of matter, articles of manufacture and methods for manufacture are set forth herein for preparation of carbon materials, battery electrodes, and the rechargeable zinc ion battery.

This invention discloses a rechargeable zinc ion battery, which comprises of a cathode containing nano carbon materials, a zinc anode, a separator for separating said cathode from said anode and an aqueous or gel electrolyte containing zinc ions.

In a preferred embodiment, the cathode is composed of the current collector and the cathode film attached to the current collector. The said cathode film contains nano carbon materials and binders. The said nano carbon materials are the carbon materials with specific nanostructure and the thickness of the said nano carbon materials in at least one dimension is 100 nanometers or less. The said carbon material is the carbon nanotube, graphene, or the mixture of carbon nanotube and graphene at any mixture content. The said binder is selected from the group consisting of natural and synthetic rubbers, polysulfone, acrylic polymers, epoxy resins, polystyrene and polytetrafluoroethylene. The said cathode film contains conductive additives, whose weight content is 50% or less.

In a preferred embodiment, the zinc anode is the foil of pure zinc or zinc alloy. The said zinc anode can also be a compressed anode film of pure zinc and/or zinc alloy particles, electrically conductive particles and a binder, and this compressed film is normally attached by the used binder on a current collector. The said anode film contains anticorrosion agents. The weigh content of the anticorrosion agents in the anode film is 1 percent or less. The said anticorrosion includes indium oxides, indium hydroxide, or the mixture of indium oxides and indium hydroxide. The said binder is selected from the group consisting of natural and synthetic rubbers, polysulfone, acrylic polymers, epoxy resins, polystyrene and polytetrafluoroethylene. The said anode film contains conductive additives, whose weight content is 50% or less.

In a preferred embodiment, the aqueous electrolyte comprises a solvent and a solute. The said solvent is water. The said solute could be zinc nitride, zinc chloride, and/or zinc sulfate, etc. The pH value of the said electrolyte can be adjusted from by acid or alkaline. The pH value of said aqueous electrolyte can be adjusted between 4 and 7.

Figure 1:
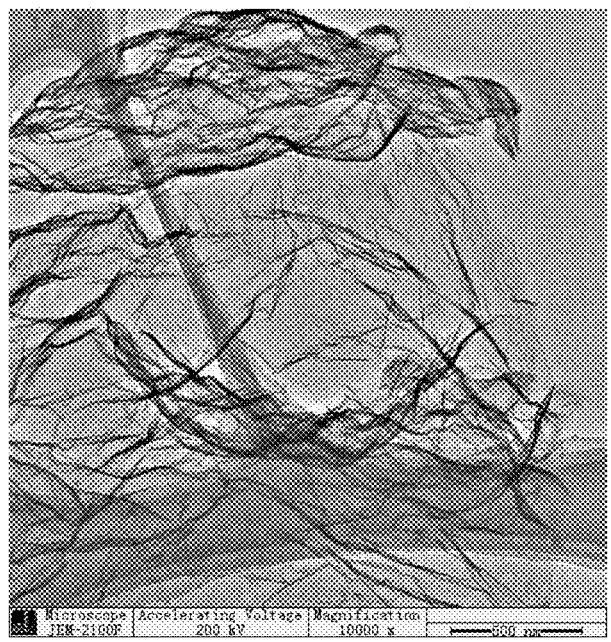
FIG. 1 The transmission electron microscope (TEM) image of graphene.

The transmission electron microscope (TEM) image of graphene is shown in FIG. 1. Cathodic electrodes were prepared by mixing 80 wt % of graphene powder as active material with 10 wt % acetylene black and 10 wt % polytetrafluoroethylene (PTFE). 80 mg of graphene powder and 10 mg of acetylene black were first mixed and dispersed in ethanol by ultrasound for 30 min. Then the ink was dried at 80° C. for 4 h to get dark mixed powder and 10 mg of PTFE was added to get a paste. Then the paste was dried at 80° C. and a few of 1-methy-2-pyrrolidinone (NMP) were added to get a syrup. The syrup was cold rolled into thick films and pieces of film with 1 cm$^2$ in size, were then hot-pressed at 80° C. under 100 MPa on a titanium plate. Then we got the graphene electrode.

Figure 2:
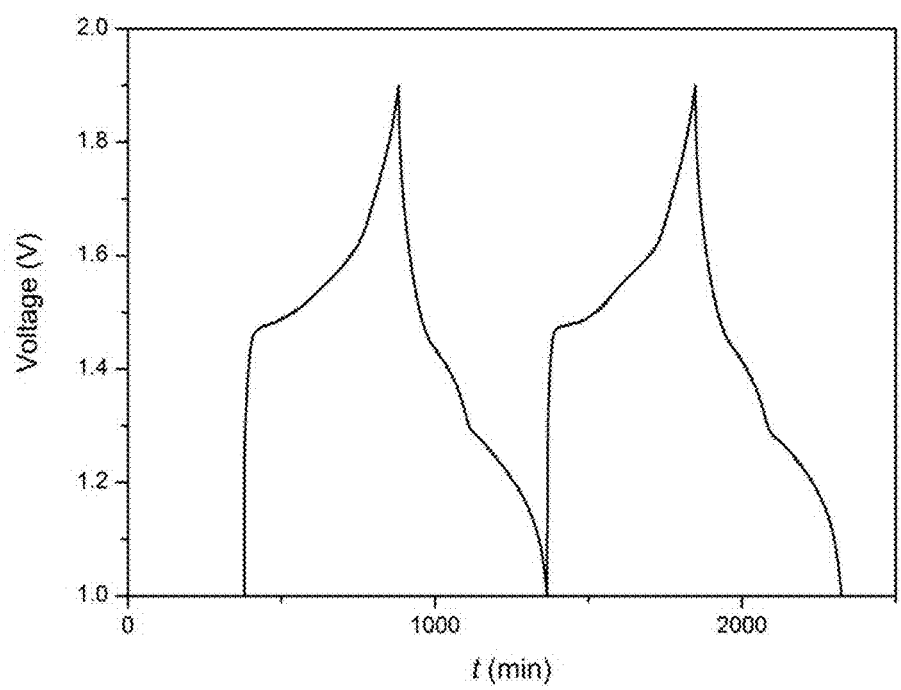
FIG. 2 The discharge and charge curves of Cell 1 at a current density of 0.3 A g$^{-1}$ (based on the positive active mass).

The battery test used the coin cell assembly consisting of graphene electrode as cathode and zinc film (40 μm in thickness) as anode. A glass paper was used as the separator. The electrolyte is 1 mol L$^{-1}$ ZnSO$_4$ aqueous solution. This cell was denoted as Cell 1. The discharge and charge curves of cell 1 are shown in FIG. 2 at a current density of 0.3 A g$^{-1}$ (based on the positive active mass). The capacity of this battery is over 2500 mAh g$^{-1}$. During cycling the coloumbic efficiency of such battery is close to 100%.

Figure 3:
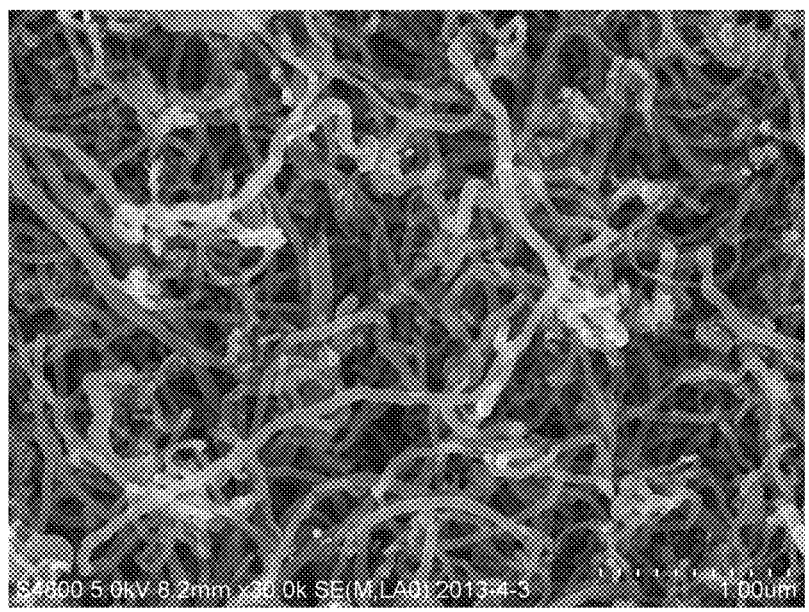
FIG. 3 The scanning electron microscope image of carbon nanotube.

We also used other carbon material (carbon nanotube) as the positive active material and named it as Cell 2. The scanning electron microscope image of carbon nanotube is shown in FIG. 3. Cathodic electrodes were prepared by mixing 80 wt % of carbon nanotube powder as active material with 10 wt % acetylene black and 10 wt % polytetrafluoroethylene (PTFE). 80 mg of carbon nanotube powder and 10 mg of acetylene black were first mixed and dispersed in ethanol by ultrasound for 30 min. Then the ink was dried at 80° C. for 4 h to get dark mixed powder and 10 mg of PTFE was added to get a paste. Then the paste was dried at 80° C. and a few of 1-methy-2-pyrrolidinone (NMP) were added to get a syrup. The syrup was cold rolled into thick films and pieces of film with 1 cm$^2$ in size, were then hot-pressed at 80° C. under 100 MPa on a titanium plate. Then we got the carbon nanotube electrode.

Figure 4:
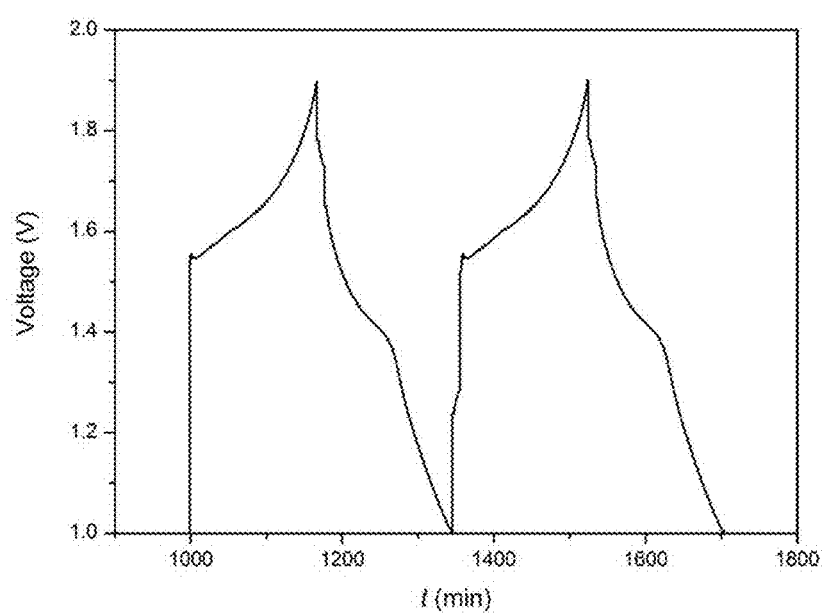
FIG. 4 The charge and discharge curves of Cell 2.

The zinc powder was also considered to be used as anodic active material. 40% zinc powder, 50% carbon black and 10% PTFE were mixed and pressed on titanium foil as zinc powder electrode. The battery test used the coin cell assembly consisting of carbon nanotube electrode as cathode and zinc powder electrode as anode. A glass paper was used as the separator. The electrolyte is 1 mol L$_{-1}$ ZnSO$_4$ aqueous solution. This cell was denoted as Cell 2. The discharge and charge curves of cell 2 are shown in FIG. 4 at a current density of 0.5 A g$^{-1}$ (based on the positive active mass). The capacity of this battery is over 1450 mAh g$^{-1}$. During cycling the coloumbic efficiency of such battery is close to 100%.

What is claimed is:

1. A rechargeable zinc ion battery comprising:
a cathode whose cathode active material consists of a nanostructured carbon material;
a zinc anode;
a separator for separating said cathode from said anode; and
an aqueous or gel electrolyte containing zinc ions.

2. The rechargeable zinc ion battery of claim 1, wherein said nanostructured carbon material is at least one selected from the group consisting of fullerene, carbon nanotube, graphene, carbon fiber, and carbon foam.

3. The rechargeable zinc ion battery of claim 1, wherein said zinc anode comprises a pure zinc or a zinc alloy.

4. The rechargeable zinc ion battery of claim 1, wherein said zinc anode comprises a compressed mixture of pure zinc and/or zinc alloy particles, electrically conductive particles and a binder.

5. The rechargeable zinc ion battery of claim 4, wherein said binder is at least one selected from the groups consisting of natural rubber, synthetic rubber, polysulfone, acrylic polymers, epoxy resins, polystyrene and polytetrafluoroethylene.

6. The rechargeable zinc ion battery of claim 1, wherein said aqueous or gel electrolyte contains $ZnSO_4$, $Zn(NO_3)_2$, and $ZnCl_2$.

7. A rechargeable zinc ion battery consisting of:
a cathode consisting of graphene, acetylene black, PVDF, 1-methy-2-pyrrolidinone and a titanium plate;
an anode consisting of a zinc film;
a glass paper for separating said cathode from said anode;
an aqueous electrolyte containing zinc ions; and
a body.

8. A rechargeable zinc ion battery, consisting of: a cathode; an anode; a separator; and an aqueous electrolyte and a body,
wherein the cathode consists of carbon nanotube, an acetylene black, PVDF, 1-methy-2-pyrrolidinone and a titanium plate,
the anode including zinc powder, carbon black, PTFE and a titanium plate,
the separator is a glass paper, and
the aqueous electrolyte contains zinc ions.

9. The rechargeable zinc ion battery of claim 1, wherein the zinc anode further comprises an anticorrosion agent.

10. The rechargeable zinc ion battery of claim 4, wherein the compressed mixture is attached on a current collector.

* * * * *